United States Patent [19]
Bui et al.

[11] Patent Number: 6,109,564
[45] Date of Patent: Aug. 29, 2000

[54] ELECTROMAGNETIC, SLIDING SPACE ENVIRONMENT PROTECTION SATELLITE DOOR

[75] Inventors: Phi-Anh Bui, Murfreesboro, Tenn.; Margaret Showalter, Albuquerque, N. Mex.; Darren Hand, Albuquerque, N. Mex.; Albert Kwong, Albuquerque, N. Mex.; Kendra Lipinski, Albuquerque, N. Mex.; Val Lipinski, Albuquerque, N. Mex.; David Paradiso, Thousand Oaks, Calif.; Carl Towner; David Tseng, both of Albuquerque, N. Mex.; Wesley Turner, Colorado Spring, Colo.

[73] Assignee: The United States of America as represented by the Secretary of the Air Force, Washington, D.C.

[21] Appl. No.: 09/388,571

[22] Filed: Sep. 2, 1999

[51] Int. Cl.[7] ........................................ B64G 1/00

[52] U.S. Cl. ...................... 244/158 R; 244/159; 244/162; 220/230

[58] Field of Search ................................ 244/158 R, 159, 244/162, 129.4, 129.5; 220/230; 49/404

[56] References Cited

U.S. PATENT DOCUMENTS

| | | | |
|---|---|---|---|
| 3,146,500 | 9/1964 | Volkert | 244/162 |
| 4,110,552 | 8/1978 | Lombardi | 220/230 |
| 4,842,223 | 6/1989 | Allton et al. | 244/158 R |
| 4,872,625 | 10/1989 | Filley | 244/159 |
| 5,534,663 | 7/1996 | Rivers et al. | 220/230 |

*Primary Examiner*—J. Woodrow Eldred
*Attorney, Agent, or Firm*—Kenneth E. Callahan

[57] ABSTRACT

A magnetically suspended door is described for the protection of spacecraft instrumentation exposed to space. The door is slid between an opened or closed position using electromagnets.

2 Claims, 2 Drawing Sheets

ELECTROMAGNETIC, SLIDING SPACE ENVIRONMENT PROTECTION SATELLITE DOOR

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

This invention is in the field of environmental covers for spacecraft instrumentation.

2. Description of the Prior Art

Satellites frequently use hatches/doors (hereafter referred to as doors) to protect instrumentation from the space environment when not in use. These protective doors are usually mechanically activated using various gears, hinges, springs, and other moving parts. The moving parts are subject to friction and wear out over time causing failure or malfunction of the protective door. There is a need for an environmental door with no mechanical or moving parts other than the door itself.

SUMMARY OF THE INVENTION

A magnetically suspended sliding door is described for use as an environmental cover for spacecraft instrumentation. The door is opened and closed using electromagnets and has no moving parts other than the door itself.

DESCRIPTION OF THE PREFERRED EMBODIMENT

Figure 1:
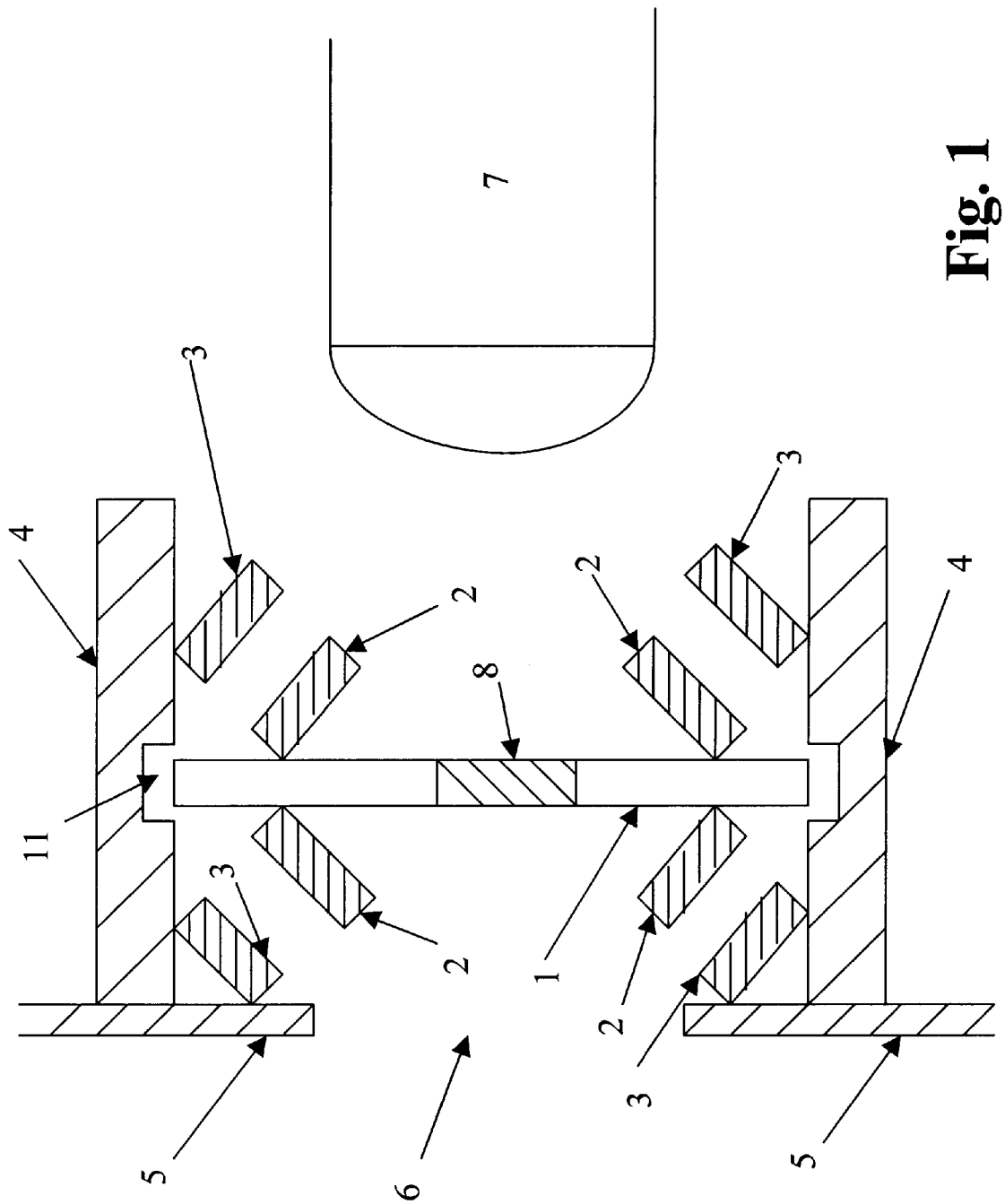
FIG. 1—Side view of magnetically suspended sliding door.

The side view of the magnetically suspended sliding door is shown in FIG. 1. In this edge-on view, the door 1 has canted, permanent magnets or strips of magnetized material 2 attached along the top and bottom edges of the door on both sides. Permanent magnets or strips of magnetized material (rails) 3 canted at a similar angle to the door strips are attached to the spacecraft structure 4. The structures the rails are attached to are themselves attached to the outer skin 5 of the spacecraft. The skin has an aperture 6 for exposing the instrumentation 7, e.g., optics, lasers, cameras, etc. to space. The polarity of the magnets are such that when the door is placed between the rails, the door magnets repel their opposing magnetic rails, thereby causing the door to be magnetically suspended.

Figure 2:
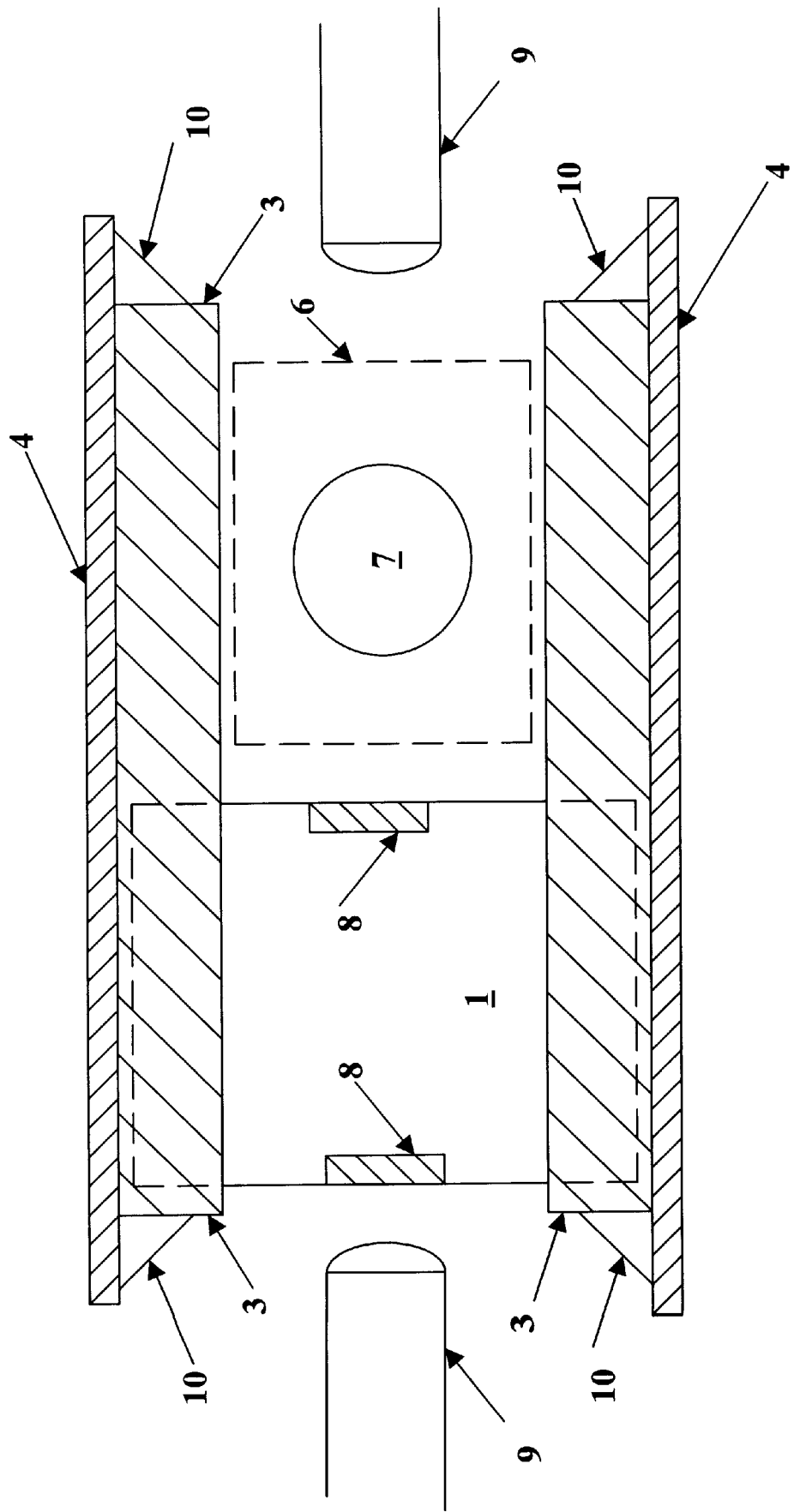
FIG. 2—Front view of sliding door.

Permanent magnets 8 are attached at each side edge of the door and centrally located. The door width is sufficient to shield the spacecraft instrument 7 it is designed to protect. The rails 3 are approximately twice the length of the door's width permitting it be in an opened or closed position by sliding from one side to the other. FIG. 2 shows a front view of the door in an open position exposing the instrument. The spacecraft outer skin 5 is not shown in FIG. 2; dashed lines indicate the aperture 6. An electromagnet 9 is located at each end of the sliding door's range of motion. Attraction/repulsion by these electromagnets acting on the permanent magnets 8 in the door edges causes the door to slide to the open or closed position. The range of motion is limited by stops 10 in front of the electromagnets. On either edge of the door where the permanent magnets 8 are attached, there is an optional groove 11 within which the top and bottom edges of the door fit to limit the range of motion perpendicular to the door's primary surface. This groove can be lubricated to allow the door to slide smoothly between the open and closed position.

We claim:

1. A magnetically suspended protective door for spacecraft instrumentation, the instrument being exposed to space through an aperture in the skin of the spacecraft, said aperture having top and bottom edges and of sufficient width to expose the instrument, the protective door comprising:

a. a door having a front and back side, top and bottom edges, left and right edges and having sufficient width and height to completely cover the spacecraft aperture;

b. permanent magnets attached to said door along the entire top and bottom edges on both the front and back sides and canted out slightly from the plane of said door, and further having permanent magnets centrally attached to the left and right edges of said door;

c. means for attaching a set of parallel, permanent magnetic rails of length approximately twice the width of said door, parallel to the top edge and to the bottom edge of the spacecraft aperture, said top set and bottom set of parallel rails being spaced apart and canted out from each other such that when said door is positioned between said rails the top and bottom door magnets are parallel to said rails and spaced a small distance apart, and further that the magnetic polarity is such that the door magnets repel the rail magnets, thereby magnetically suspending the door in said aperture;

d. electromagnetic means positioned at the ends of said rails and centrally located between said rails such that the door can be slid to an opened or closed position by the magnetic attraction or repulsion of the electromagnetic means and the permanent magnets centrally attached to the left and right edges of said door.

2. The magnetically suspended protective door of claim 1, wherein there is a top and bottom groove 11 in the spacecraft structure 4 parallel to the door's direction of motion within which the top and bottom edges of the door are constrained.

\* \* \* \* \*